A. BESSETTE.
BUTTON FASTENER FOR AUTOMOBILE CURTAINS.
APPLICATION FILED DEC. 18, 1907.

No. 906,607.

Patented Dec. 15, 1908.

Witnesses:
H. L. Sprague
H. W. Bowen

Inventor,
Alfred Bessette.
by Chapin & Co.
Attorneys.

UNITED STATES PATENT OFFICE.

ALFRED BESSETTE, OF HOLYOKE, MASSACHUSETTS.

BUTTON-FASTENER FOR AUTOMOBILE-CURTAINS.

No. 906,607.  Specification of Letters Patent.  Patented Dec. 15, 1908.

Application filed December 18, 1907. Serial No. 406,979.

*To all whom it may concern:*

Be it known that I, ALFRED BESSETTE, a subject of the King of England, residing at Holyoke, in the county of Hampden and State of Massachusetts, have invented new and useful Improvements in Button-Fasteners for Automobile-Curtains, of which the following is a specification.

This invention relates to improvements in curtain fasteners or buttons, and is particularly designed for securely holding in place the curtains of automobile tops, the object of the invention being to provide a device that is simple in structure and one that is strong and easily operated to fasten and unfasten the curtains of an automobile, or for other similar uses.

In general, the invention consists in securing a rotatable member to a fixed member and with means located between the two members for adjustably locking the rotatable member so as to register with an opening or button-hole in the curtain piece, or to stand transversely of the opening, said means permitting the rotatable member to be yieldingly moved from either position upon an excess of pressure against the locking means.

Figure 1:
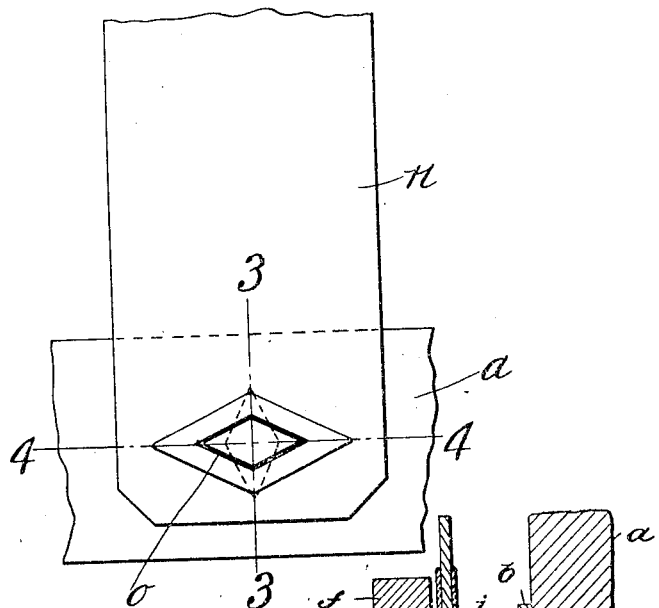
Figure 2:
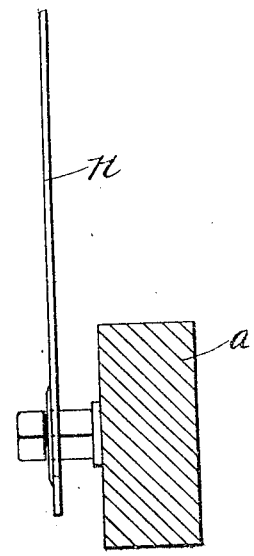
Figure 3:
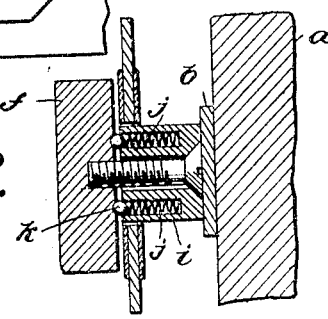
Figure 4:
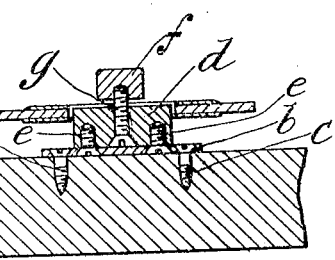
Figure 5:
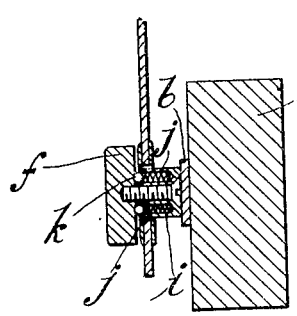
Figure 5:
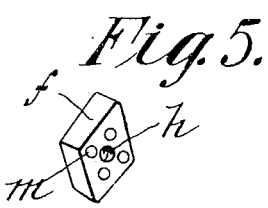

In the drawings forming part of this application,—Figure 1 is a plan view of a portion of a curtain showing in full lines the rotatable member in register with the button-hole, and in dotted lines located transversely of said button-hole. Fig. 2 is a side elevation of Fig. 1, and Fig. 3 is a sectional elevation on line 3—3 of Fig. 1 showing the locking means in detail. Fig. 4 is a longitudinal sectional view on the line 4—4 of Fig. 1 showing the rotatable member transversely located and in locking position. Fig. 5 is a detail perspective view of the under side of the rotatable member showing the recesses for engaging the locking means.

Referring to the drawings in detail, $a$ designates a fixed member to which is secured the plate $b$ by means of the screws $c$. Secured to the plate $b$ is a member $d$ by means of the screws $e$; this member is diamond-shape in plan view, although I do not limit myself to any particular form.

$f$ designates a button member that is rotatably secured to the fixed member $d$ by means of the screw $g$ which rotates in the fixed member $d$, and is threaded into the rotatable member $f$ at the point $h$.

$i$ designates holes or openings in the fixed member $d$, as shown in Fig. 3, and in these holes or openings are placed springs $j$ for normally exerting an outward pressure on the locking balls $k$ forcing the same into contact with depressions or recesses in the under side of the rotatable member $f$. These balls are adapted to engage the sockets or depressions $m$,—there being four of them, as clearly shown in Fig. 5,—and when the spring-pressed balls engage these depressions, the rotatable member $f$ is held fixed in either a locking or unlocking position but will readily yield upon rotary pressure being exerted thereon by the operator.

The curtain element $n$ is provided with a button-hole opening $o$ that is similar in shape to the rotatable locking element $f$ so that when the curtain is placed over the locking element and into engagement with the fixed member $d$, and the button rotated, the curtain will be securely locked to its support, as clearly shown in Fig. 1, and held in this position by means of the balls $k$ engaging the recesses $m$. To unfasten the curtain element, it is simply necessary to reverse the operation.

What I claim, is:—

As an improvement in fastening devices having in combination, a suitable support, a member, as $d$, secured thereto, a button member, as $f$, and means including a screw, as $g$, rotatably mounted in said member, the button member having recesses on the under side thereof, and means including elastic elements mounted in said member, as $j$, balls, as $k$, engaged by the elastic elements, for normally engaging the recesses on the under side of the rotatable member, as described.

ALFRED BESSETTE.

Witnesses:
K. I. CLEMONS,
H. W. BOWEN.